UNITED STATES PATENT OFFICE.

LOUIS D. CHEMIOUX, OF CHICAGO, ILLINOIS.

IMPROVEMENT IN COOKED CORN-BEEF.

Specification forming part of Letters Patent No. 153,046, dated July 14, 1874; reissue No. 6,074, dated October 6, 1874; application filed September 25, 1874.

*To all whom it may concern:*

Be it known that I, LOUIS D. CHEMIOUX, of Chicago, in the county of Cook and State of Illinois, have invented a new and Improved Process of Preserving and Pressing Beef and other meats; and I do hereby declare the following to be a full, clear, and exact description thereof, which will enable others skilled in the art to which my invention appertains to carry out the same.

My invention relates to that class of processes employed in preserving beef and other cooked meats; and its object is to retain their nutritive qualities and solidity without the necessity of being boxed or canned; and to that end it consists in cooking the meats in aromatic broth, then removing the bones from the meat and pressing the latter, so as to prevent its decomposing, and, when used, admit of being cut across the grain, as will be more fully understood from the following description and claim.

In carrying out my invention I prepare with beef-bones and any suitable vegetables, spices, or herbs, such as pepper, bay-tree leaves, carrots, or celery, an aromatic broth, which is boiled until the same is of the proper flavor and thickness. The meat to be preserved may be first cured, and then cooked in the aromatic broth until the bones can be readily removed. The meat is then taken from the broth and the bones and sinews removed, and the meat made into separate packages, rolled or otherwise, and each pressed in a solid form by any suitable pressure, without desiccation or the disintegration of its fibers. The meat, before being pressed, is so arranged that the grain shall extend in the direction of the length of the package, or nearly so, and thus admit of its being cut across the grain when cut for use. After the packages are properly pressed they are allowed to cool a sufficient length of time, when they may be dipped into a warm mixture of grease and charcoal-powder for the purpose of excluding the air from the surface of the meat and absorbing the gases having a tendency to produce decay. The packages, when cool, may be wrapped in an envelope made of cloth or other suitable material, which has been previously saturated with gum or other suitable mixture which will exclude the air. A sheet of foil may then be wrapped around the package, thus completing the operation.

With this process the thickened aromatic broth prevents the escape of the juices of the meat while being cooked, and, at the same time, imparts a rich and pleasant flavor, while the gelatine contained in the broth closes the pores of the meat.

Having thus described my invention, I claim—

The process of preparing meats for transportation by first cooking in an aromatic gelatinous broth prepared with gelatinous parts of meat and flavored with herbs, spices, or vegetables, then removing the bones, and then pressing or otherwise putting into compact form with the fibers lying in one direction, substantially as described.

The above specification of my invention signed by me this 21st day of September, 1874.

LOUIS D. CHEMIOUX.

Witnesses:

JOHN H. WHIPPLE,

STEPHEN A. GOODWIN.